(12) United States Patent
Kikukawa et al.

(10) Patent No.: US 11,078,000 B2
(45) Date of Patent: Aug. 3, 2021

(54) PACKAGING CONTAINER AND METHOD OF PRODUCING SAME

(71) Applicant: TOPPAN PRINTING CO., LTD., Tokyo (JP)

(72) Inventors: Junji Kikukawa, Tokyo (JP); Koichi Hotta, Tokyo (JP); Megumi Watanabe, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/709,486

(22) Filed: Dec. 10, 2019

(65) Prior Publication Data

US 2020/0140171 A1 May 7, 2020

Related U.S. Application Data

(63) Continuation of application No. PCT/JP2018/022649, filed on Jun. 13, 2018.

(30) Foreign Application Priority Data

Jun. 13, 2017 (JP) .............................. JP2017-116293

(51) Int. Cl.
```
B65D 75/00      (2006.01)
B31B 70/26      (2017.01)
B31B 70/74      (2017.01)
B32B 27/10      (2006.01)
B32B 27/32      (2006.01)
```
(Continued)

(52) U.S. Cl.
CPC ............ *B65D 75/008* (2013.01); *B31B 70/26* (2017.08); *B31B 70/79* (2017.08); *B32B 27/10* (2013.01); *B32B 27/32* (2013.01); *B65D 65/40* (2013.01); *B65D 75/20* (2013.01); *B65D 81/3461* (2013.01); *B31B 2160/102* (2017.08); *B31B 2170/20* (2017.08); *B32B 2255/12* (2013.01);
(Continued)

(58) Field of Classification Search
CPC ...... B65D 75/008; B65D 75/20; B65D 65/40; B65D 81/3461
USPC .......................................................... 383/104
See application file for complete search history.

(56) References Cited

U.S. PATENT DOCUMENTS 4,055,109 A * 10/1977 Kan ..................... B65D 75/008
                                                          493/196
4,579,781 A    4/1986 Akao
(Continued)

FOREIGN PATENT DOCUMENTS

JP        S58-173653 A    10/1983
JP        H872895 A        3/1996
(Continued)

OTHER PUBLICATIONS

Extended European Search Report dated Jun. 2, 2020 for corresponding European Patent Application No. 18818554.0.
(Continued)

*Primary Examiner* — Jes F Pascua
(74) *Attorney, Agent, or Firm* — Foley & Lardner LLP

(57) ABSTRACT

A packaging container comprises a laminated sheet where at least a substrate, a barrier layer and a sealant layer are laminated together in this order, and the laminated sheet has a stiffness of 1.01 [mN·m] or less measured by a Taber stiffness tester method in accordance with JIS-P8125.

17 Claims, 8 Drawing Sheets

(51) Int. Cl.
  *B65D 65/40* (2006.01)
  *B65D 75/20* (2006.01)
  *B65D 81/34* (2006.01)
  *B31B 170/20* (2017.01)
  *B31B 160/10* (2017.01)
(52) U.S. Cl.
  CPC ....... *B32B 2255/20* (2013.01); *B32B 2439/40* (2013.01); *B32B 2439/70* (2013.01)

(56) References Cited

U.S. PATENT DOCUMENTS

| | | | | |
|---|---|---|---|---|
| 4,837,849 | A * | 6/1989 | Erickson | B29C 65/7437 |
| | | | | 383/104 |
| 4,997,416 | A * | 3/1991 | Mitchell | B29C 65/7437 |
| | | | | 156/308.4 |
| 8,882,737 | B2 | 11/2014 | Graf et al. | |
| 2005/0079251 | A1 | 4/2005 | Bell | |
| 2008/0199644 | A1 * | 8/2008 | Chang | B32B 7/12 |
| | | | | 428/35.2 |
| 2010/0016825 | A1 * | 1/2010 | Graf | B65D 33/00 |
| | | | | 604/408 |
| 2012/0279956 | A1 * | 11/2012 | Bohrer | B65D 75/5805 |
| | | | | 219/730 |
| 2016/0083161 | A1 * | 3/2016 | Moriz | B65D 75/008 |
| | | | | 383/204 |
| 2017/0036791 | A1 * | 2/2017 | Infante | B32B 27/08 |
| 2018/0099493 | A1 | 4/2018 | Usui | |
| 2018/0251944 | A1 * | 9/2018 | Nobes | D21H 19/22 |

FOREIGN PATENT DOCUMENTS

| | | | | |
|---|---|---|---|---|
| JP | 2001018992 | A * | 1/2001 | ......... B65D 75/5822 |
| JP | 2001-213444 | A | 8/2001 | |
| JP | 2006-027646 | A | 2/2006 | |
| JP | 2006-083487 | A | 3/2006 | |
| JP | 2006-143272 | A | 6/2006 | |
| JP | 4232246 | B2 | 3/2009 | |
| JP | 2012-056617 | A | 3/2012 | |
| JP | 2013252875 | A * | 12/2013 | |
| WO | WO-2005/012134 | A1 | 2/2005 | |
| WO | WO-2009/054171 | A1 | 4/2009 | |
| WO | WO-2016/171192 | A1 | 10/2016 | |

OTHER PUBLICATIONS

International Searching Authority, "International Search Report," issued in connection with International Patent Application No. PCT/JP2018/022649, dated Aug. 21, 2018.

International Searching Authority, "Written Opinion," issued in connection with International Patent Application No. PCT/JP2018/022649, dated Aug. 21, 2018.

* cited by examiner

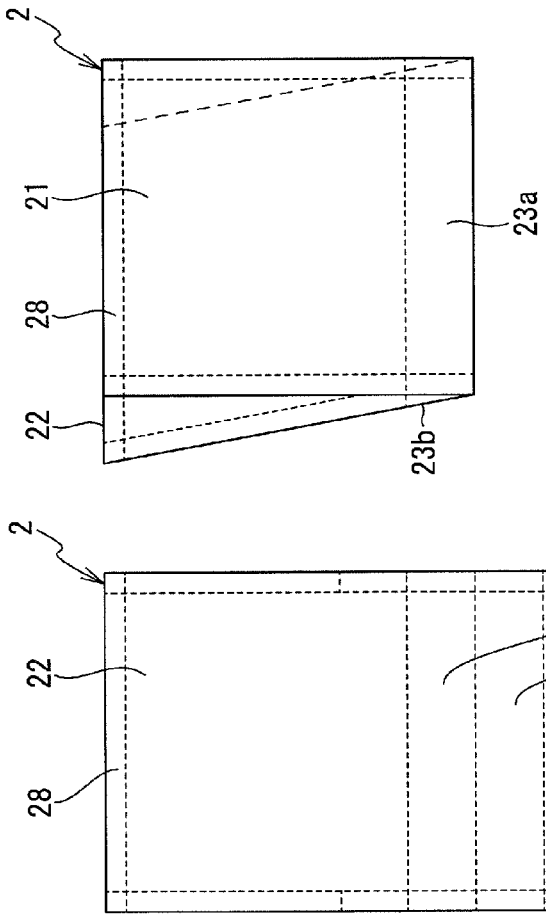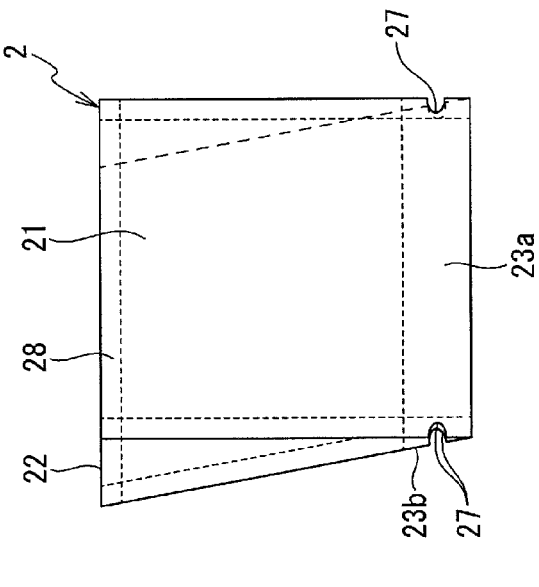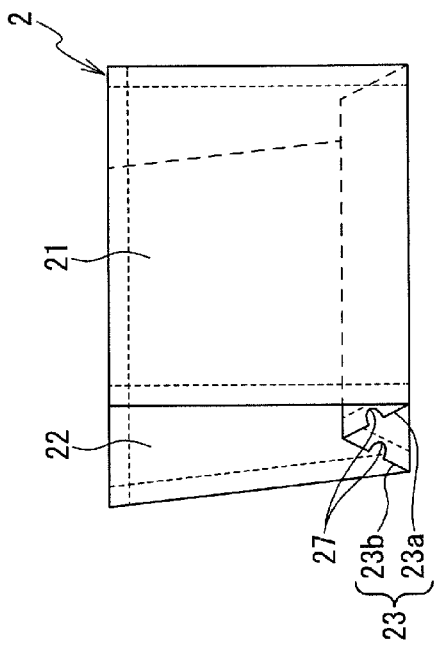

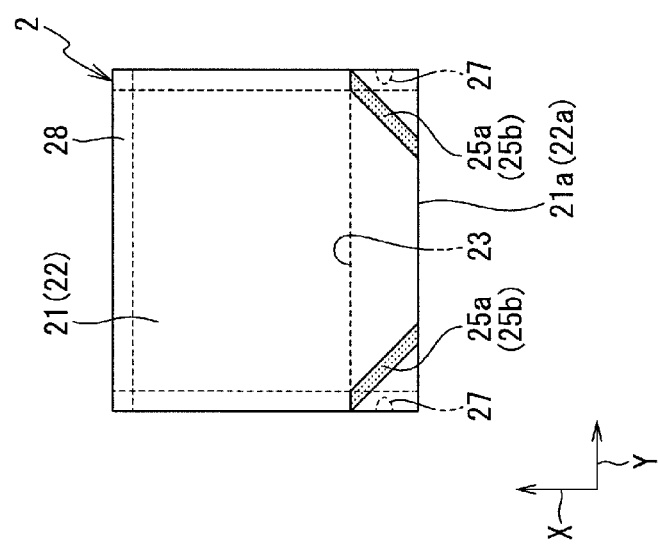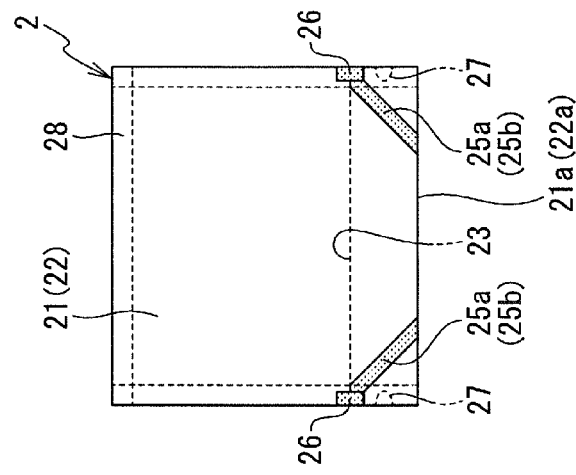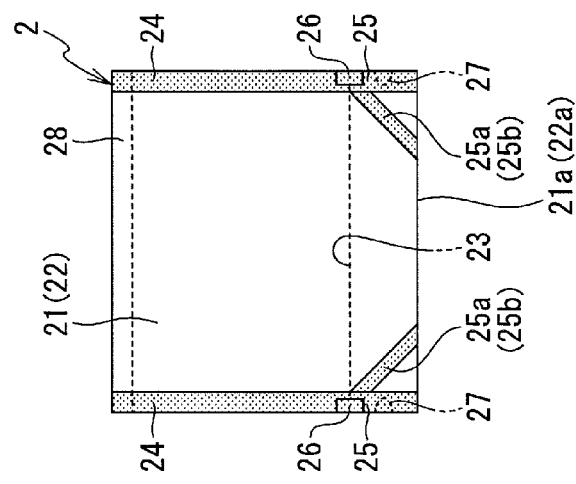

PACKAGING CONTAINER AND METHOD OF PRODUCING SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/022649, filed on Jun. 13, 2018, which is based upon and claims the benefit of priority to Japanese Patent Application No. 2017-116293, filed on Jun. 13, 2017; the disclosures of which are all incorporated herein by reference in their entireties.

TECHNICAL FIELD

The present invention relates to a packaging container and a method of producing the same, and in particular, to a packaging container for food and beverages such as retort food and drinks and a technique that may be applied in producing the same.

BACKGROUND ART

Conventional packaging containers for ready-made meals such as baby food and nursing care food, and boiled food such as curry and fish include cans, bottles and retort pouches constituted by laminated sheets in which aluminum foil is held between various plastic films. In recent years, retort pouches including an alumina or silica vapor deposited film as a substrate of laminated sheet, which can be used for cooking with a microwave oven, have also been widely distributed (see PTL 1). Use of a retort pouch such as the packaging bag of PTL1 as an alternative to cans and bottles is advantageous in view of transportation cost and ease of disposal in terms of load on the environment.

[Citation List] [Patent Literature] [PTL 1] Japanese Patent No. 4232246 B2

SUMMARY OF THE INVENTION

Technical Problem

Due to the recent growing awareness of disaster management, it has become an important feature to be able to eat and drink directly from a storage container providing a stock of food at the time of a disaster.

However, according to study by the inventors of the present invention, when a plastic film is used as a substrate as in PTL 1, the film may be low in stiffness, and in particular, there is room for improvement in applying the film to a stably freestanding packaging container. Although it is possible to enhance the stiffness by increasing the thickness of the plastic film of the substrate, it becomes difficult to dispose of, and further, the load on the environment becomes larger.

The present invention has been made in view of the circumstances mentioned above, and the object thereof is to provide an improved stably freestanding packaging container and a method of producing the same.

Solution to Problem

In order to achieve the object mentioned above, a packaging container according to one aspect of the present invention includes a laminated sheet where at least a substrate, a barrier layer and a sealant layer are laminated together in this order, the laminated sheet having a rigidity (stiffness) of 1.01 mN·m or less measured by a Taber stiffness tester method in accordance with JIS-P8125.

Moreover, the method of producing a packaging container according to one aspect of the present invention includes:

a step of preparing a laminated sheet including a substrate, a barrier layer and a sealant layer laminated together in this order, wherein the laminated sheet is formed in a rectangle having a first direction and a second direction perpendicular to each other, and a front surface portion, a first area and a second area of a bottom surface portion, and a rear surface portion are defined and formed in this order along the first direction;

a step of folding the laminated sheet in half so that the folded sealant layers face each other, and the front surface portion and the rear surface portion, and the first area and the second area of the bottom surface portion are respectively overlapped with each other;

a step of forming a blanked portion at both edges of the first area and the second area in the second direction of the first area and the second area by removing part of the both edges of the first area and the second area with the first area and the second area of the bottom surface portion being overlapped with each other;

a step of folding the first area and the second area inside between the front surface portion and the rear surface portion such that the blanked portions of the first area and the second area face each other, and the first area and the second area are overlapped with each other; and a step of sealing each sealant layer of the front surface portion and the rear surface portion, each sealant layer of the front surface portion and the first area of the bottom surface portion, each sealant layer of the front surface portion and the second area of the bottom surface portion, and each sealant layer of the front surface portion and the rear surface portion through each of the blanked portions of the first area and the second area at both end portions of the front surface portion and the rear surface portion in the second direction.

Advantageous Effects of the Invention

According to one aspect of the present invention, it is possible to provide an improved stably freestanding packaging container and a method of producing the same.

BRIEF DESCRIPTION OF THE FIGURES

FIGS. 7A, 7B, 7C, and 7D are a set of diagrams illustrating a method of producing the packaging container according to the first embodiment of the present invention.

FIGS. 8A, 8B, and 8C are a set of diagrams illustrating a method of producing the packaging container according to the first embodiment of the present invention.

DETAILED DESCRIPTION OF REPRESENTATIVE EMBODIMENTS

Figure 1:
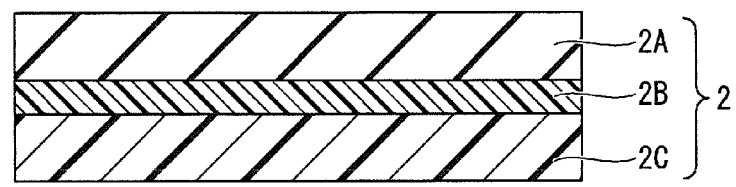
FIG. 1 is a cross-sectional view illustrating a cross-sectional structure of a laminated sheet used in the packaging container according to a first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

In the following embodiments, as an example, a packaging container for a ready-made meal application that can be stored for a longer time shall be described.

First Embodiment

As shown in FIGS. 1 to 4A, 4B, 4C, 4D, and 4E, a packaging container 1 according to the first embodiment of the present invention is constituted mainly by a laminated sheet 2.

As shown in FIG. 1, the laminated sheet 2 has a laminated structure including a substrate 2A that enhances the rigidity (stiffness) of the laminated sheet, a barrier layer 2B excellent in various barrier properties to oxygen, ultraviolet rays and the like, and a sealant layer 2C excellent in sealing properties including thermocompression sealing properties, laminated in this order. In this embodiment, as the substrate 2A, for example, a paper base having a basis weight of 60 to 140 g/m² and a thickness of 120 to 220 μm is used. Moreover, as the barrier layer 2B, for example, a barrier film having a thickness of the order of 12 μm, which is formed by vapor depositing an inorganic compound, is used. Moreover, as the sealant layer 2C, for example, an unstretched polypropylene film (CPP film) having a thickness of 70 μm or more is used.

For example, the oxygen permeability of the laminated sheet 2 (oxygen transmission rate) was measured with an apparatus of model number: OXTRAN 2/21 ML manufactured by MOCON Co. for a plurality of laminated sheets 2 at 30° C. and at 70% RH (relative humidity), and values of 0.01, 0.002, 0.039 and 0.014 cc/m²/day/atm were obtained. This measurement method was in accordance with the MOCON method (JIS-K7126-2: 2006).

Moreover, water vapor permeability of a plurality of laminated sheets 2 was measured by a cup method at 40° C. and at 90% RH (relative humidity), and values of 0.565, 0.651, 0.929 and 0.957 g/m²/day were obtained. This measurement method was in accordance with JIS-Z0208: 1976.

Figure 2:
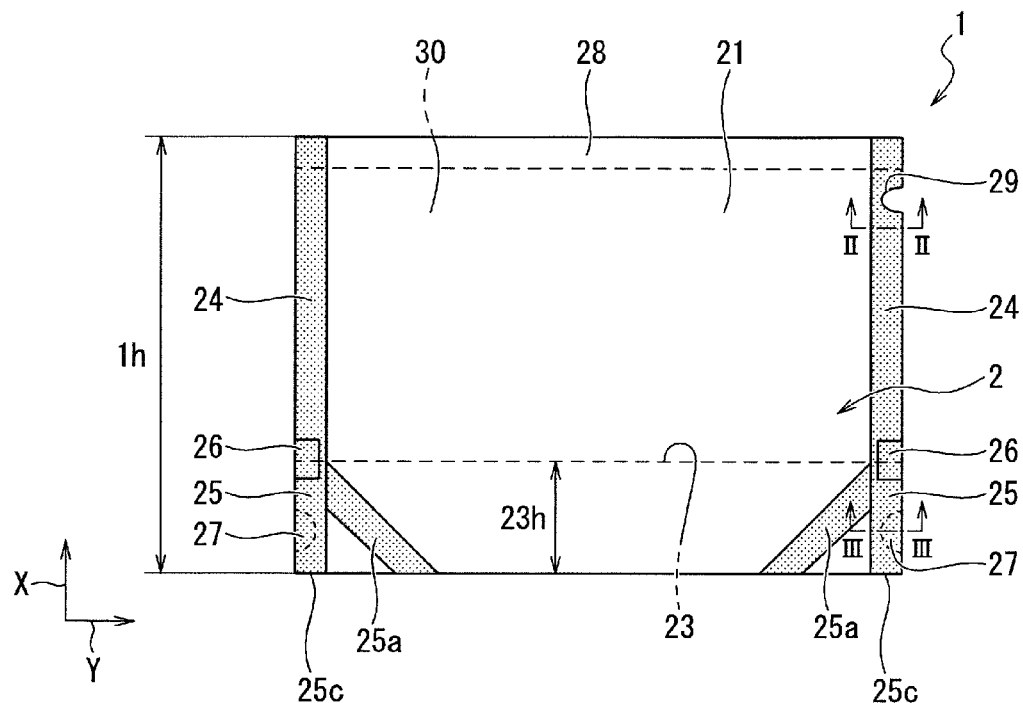
FIG. 2 is a front view of a front face side of the packaging container according to the first embodiment of the present invention.
Figure 3:
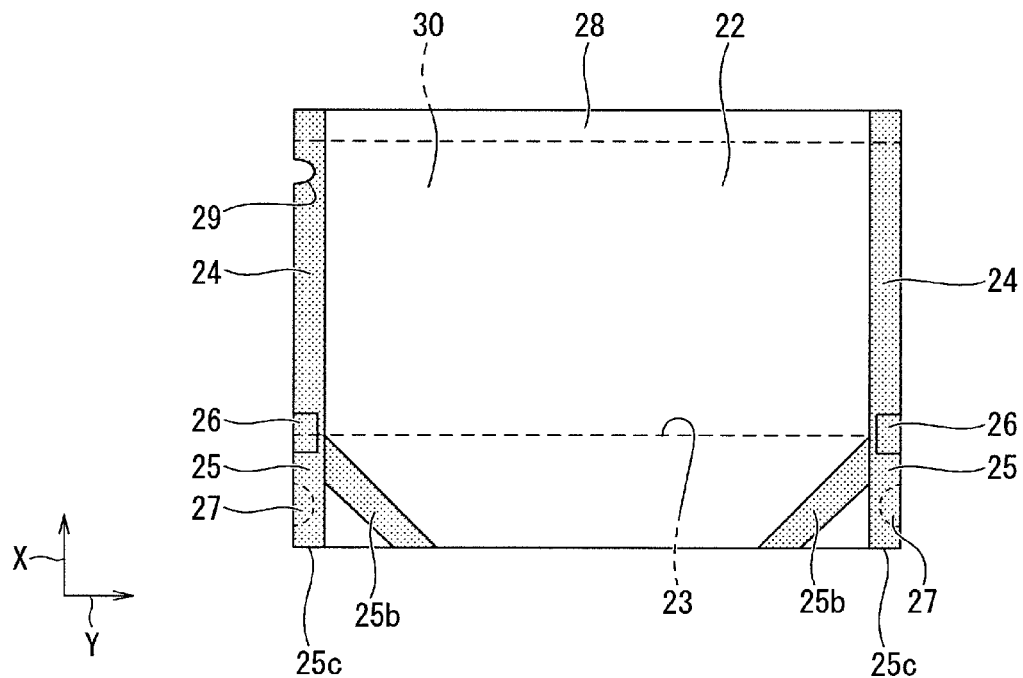
FIG. 3 is a rear view of a rear face side opposite to the front face of the packaging container according to the first embodiment of the present invention.

The packaging container 1 is formed by folding a laminated sheet 2 into a W shape in side view such that the sealant layers 2C face each other. That is, as shown in FIGS. 2 and 3, the packaging container 1 is provided with a front surface portion 21 and a rear surface portion 22 in a facing arrangement so that the sealant layers 2C face each other, and a bottom surface portion 23 folded between the front surface portion 21 and the rear surface portion 22 from one end (a first end) to the other end (a second end) in the first direction of the front surface portion 21 and the rear surface portion 22. Each of the front surface portion 21 and the rear surface portion 22 has a height in the first direction (X direction) and a width in the second direction (Y direction) orthogonal to the first direction in the same plane. In this embodiment, the X direction that is the first direction may be referred to as the height direction, and the Y direction that is the second direction may be referred to as the width direction. Therefore, the bottom surface portion 23 is provided on one of ends, that is, it is provided on a first end (one end) opposite to a second end (the other end) in the height direction (X direction) of each of the front surface portion 21 and the rear surface portion 22. The bottom surface portion 23 is folded in half between the front surface portion 21 and the rear surface portion 22 such that the first area 23a and the second area 23b face each other (see FIG. 4C).

Moreover, the packaging container 1 is provided with a side sealing portion 24 having two-layered structure in which edge portions of the front surface portion 21 and the rear surface portion 22 in the width direction (hereinafter may simply be referred to as edges) are overlapped with each other and are sealed, and a bottom surface sealing portion 25 having four-layered layered structure in which edge portions of the front surface portion 21 and the rear surface portion 22, and edge portions of the bottom surface portion 23 in the width direction (hereinafter may simply be referred to as edges) are overlapped with one another and are sealed. Further, in FIGS. 2 and 3, the side sealing portion 24, the bottom surface sealing portion 25, and a reinforcing sealing portion 25a to be described later are shown by hatching. Each of the side sealing portion 24 and the bottom surface sealing portion 25 is provided at edges of the front surface portion 21 and the rear surface portion 22, the edges facing with each other in the width direction (Y direction). The bottom surface sealing portion 25 extends from the first end (one side) to the second end (the other side) of the front surface portion 21 and the rear surface portion 22, and the side sealing portion 24 is connected to the bottom surface sealing portion 25 and extends from the bottom surface sealing portion 25 to the second end of the front surface portion 21 and the rear surface portion 22. A size 23h of the bottom folded depth where the bottom surface portion 23 is folded, in other words, the height of the bottom surface sealing portion 25 is preferably 10 to 40% of the size of the height 1h of the front surface portion 21 and the rear surface portion 22. When the size is less than 10%, which is smaller than the above range, the bottom surface portion 23 when opened becomes narrow and the packaging container 1 cannot stably stand upright by itself. Moreover, when the size is more than 40%, which is larger than the above range, the bottom part 23 cannot be fully opened when the folded bottom surface portion 23 is attempted to be opened, and therefore the packaging container 1 cannot stably stand upright by itself. A more preferred range is 15 to 25%. In this range, the stability of standing upright by itself further improves.

Moreover, the packaging container 1 is provided with a reinforcing sealing portion 25a having two-layered structure in which the first area 23a, which is one of the first area 23a and the second area 23b of the bottom surface portion 23, and the front surface portion 21 are overlapped with each other and are sealed, and a reinforcing sealing portion 25b having four-layered structure in which the second area 23b, which is the other of the first area 23a and the second area 23b of the bottom surface portion 23, and the rear surface portion 22 are overlapped with each other and are sealed. Each of the reinforcing sealing portions 25a and 25b are provided at both edges of the front surface portion 21 and the rear surface portion 22, the edges facing each other in the width direction of the. The reinforcing sealing portions 25a and 25b provided at one of the edges of the front surface portion 21 and the rear surface portion 22, extend from the first end of the front surface portion 21 and the rear surface portion 22 toward one bottom surface sealing portion 25, and is connected to the one bottom surface sealing portion 25. The reinforcing sealing portions 25a and 25b provided at one of the edges of the front surface portion 21 and the rear surface portion 22, extend from the first end of the front surface portion 21 and the rear surface portion 22 toward one bottom surface sealing portion 25, and is connected to the one bottom surface sealing portion 25.

Moreover, the packaging container 1 is provided with a containing portion 30 surrounded by the front surface portion 21, the rear surface portion 22 and the bottom surface portion 23, and formed by sealing the front surface portion 21, the rear surface portion 22 and the bottom surface portion 23 by sealing the side sealing portion 24 and the bottom surface sealing portion 25. The side sealing portion 24, the bottom surface sealing portion 25 and the reinforcing sealing portions 25a and 25b are formed by thermocompression sealing, ultrasonic welding or the like.

At the boundary part between the bottom surface sealing portion 25 and the side sealing portion 24, a point sealing portion 26 is provided toward the bottom surface sealing portion 25 and the side sealing portion 24 in order to enhance the sealing performance. Preferably, the point sealing portion 26 is formed in a width that is 40 to 90% of the sealing width of the bottom surface sealing portion 25 and the side sealing portion 24. The point sealing portion 26 is provided in each of the two rims of the front surface portion 21 and the rear surface portion 22 in the width direction.

Moreover, the point sealing portion 26 preferably has a length in the bottom surface sealing portion 25 in the X direction in a ratio of 10% or more with respect to the entire length in the X direction provided toward the side sealing portion 24 and the bottom surface sealing portion 25. When the ratio is less than 10%, the strength is insufficient, and the possibility that food or drink (content) in the containing portion 30 leaks when the packaging container 1 is dropped increases.

Figure 5:
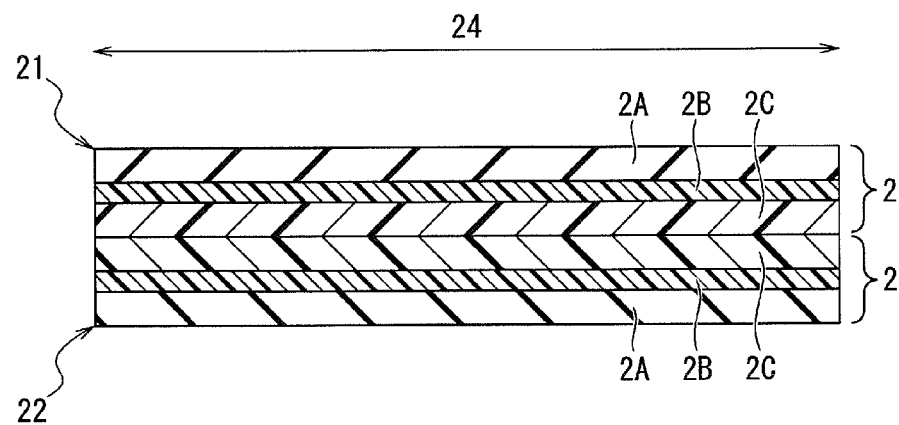
FIG. 5 is a cross-sectional view illustrating a cross-sectional structure taken along the line II-II in FIG. 2.

Further, when sealing is performed by thermocompression sealing or ultrasonic welding, the sealant layers 2C fuse with each other as shown in FIG. 5, and therefore a sealing line is not clearly visible from the outer surface (surface on the side of the substrate 2A of the laminated sheet 2) of the packaging container 1. For this reason, the designability of the outer surface of the packaging container 1 is not impaired.

Figure 6:
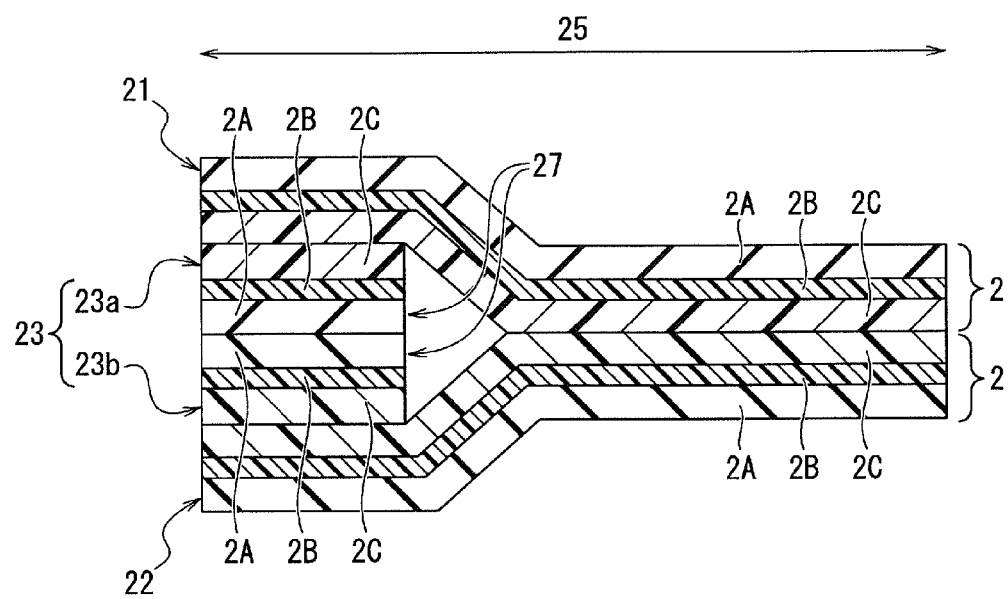
FIG. 6 is a cross-sectional view illustrating a cross-sectional structure taken along the line in FIG. 2.

As shown in FIGS. 2 and 3, a blanked portion 27 is provided in each of the two bottom surface sealing portions 25. As shown in FIG. 6, the substrates 2A need to be bonded to each other at each bottom surface sealing portion 25 to form the bottom surface portion 23. With the blanked portion 27 provided, the sealant layer 2C can be exposed towards the bottom surface portion 23 at the bottom surface sealing portion 25. That is, in the bottom surface sealing portion 25, the sealant layers 2C of the front surface portion 21 and that of the rear surface portion 22 can be fused together with each other through the blanked portion 27 provided in each of the first area 23a and the second area 23b of the bottom surface portion 23. The blanked portion 27 is preferably provided at a position that is 5 to 50% of the bottom folded depth (size 23h) from the bottom edge of the bottom surface sealing portion 25. When the position is below this range, not only can the area of the blanked portion not be sufficiently secured, but also the impact of a drop is concentrated in a drop test, and the bag breaking resistant strength reduces. Moreover, if the position was above this range, the lower side of the bottom surface portion which is not sealed would open by the weight of the contents, and therefore it cannot stably stand upright by itself. An even more preferable range is 5 to 30%, and a further preferable range is 10 to 20%. In this range, both the bag breaking resistance strength in a drop test and the stability of standing upright by itself further improve.

In this embodiment, the blanked portion 27 is constituted by a wide slit (band-like cut off region) having a predetermined width inside a rim of the bottom surface sealing portion 25, but the blanked portion 27 may be constituted by a through-hole with a planar shape of a circle or an ellipse.

At the second end of the front surface portion 21 and the rear surface portion 22, a sealing portion 28, which seals the containing portion 30 by overlapping the front surface portion 21 and the rear surface portion 22 in double after putting food in the containing portion 30, is provided. Moreover, in at least one of the two side sealing portions 24, a cut off part 29 is provided for releasing the upper part side of the containing portion by cutting off the upper part side of the front surface portion 21 and the rear surface portion 22 when taking out food from the containing portion 30 after retorting (after heat treatment).

Figure 4A:
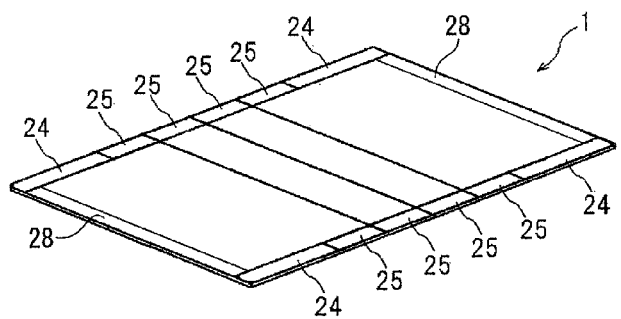
FIGS. 4A, 4B, 4C, 4D, and 4E are a set of perspective views illustrating an assembly method of the packaging container according to the first embodiment of the present invention.
Figure 4B:
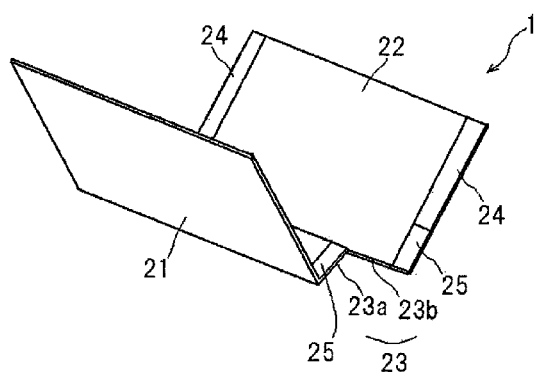

The packaging container 1 constituted as such defines and forms, in the sheet state as shown in FIGS. 4A and 4B, the front surface portion 21, the bottom surface portion 23 (the first area 23a, the second area 23b) and the rear surface portion 22 in the longitudinal direction in this order. Next, the bottom surface sealing portions 25, 25 are provided at both edge sides in the width direction (the second direction) of each of the first area 23a and the second area 23b. Moreover, the side sealing portion 24 and the bottom surface sealing portion 25 are provided at both edge sides in the width direction of each of the first area 23a and the second area 23b. Among these, the side sealing portions 24 are provided so as to be located at both edges, and extending in the longitudinal direction (the first direction) of the packaging container in the sheet state. That is, the side sealing portion 24, the bottom surface sealing portion 25, the bottom surface sealing portion 25, the bottom surface sealing portion 25, the bottom surface sealing portion 25 and the side sealing portion 24 are provided in this order along the longitudinal direction of the packaging container 1 in the sheet state.

The size of the bottom surface sealing portion 25 in the longitudinal direction (the first direction) is set to be approximately equal to the sizes of the first area 23a and the second area 23b along the longitudinal direction (the first direction) of the packaging container 1 in the sheet state. The size of the bottom surface sealing portion 25 in the longitudinal direction (the first direction) provided in the front surface portion 21 and the rear surface portion 22 preferably is approximately equal to the size of the bottom surface sealing portion 25 in the longitudinal direction (first direction) provided in the bottom surface portion 23.

Next, as shown in FIG. 4B, the first area 23a and the second area 23b are folded to form a peak, and the front surface portion 21 or the rear surface portion 22 and the bottom surface portion 23 are folded to form valleys, to form a W shape in side view, and the packaging container 1 in the sheet state is folded such that the front surface portion 21 and the rear surface portion 22 face each other.

Figure 4C:
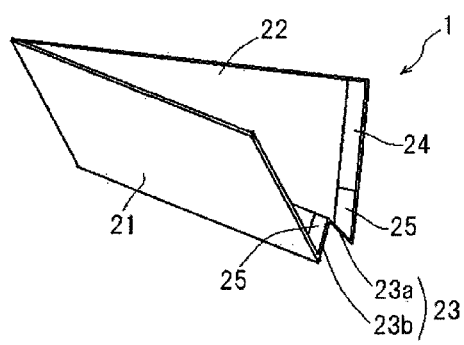
Figure 4D:
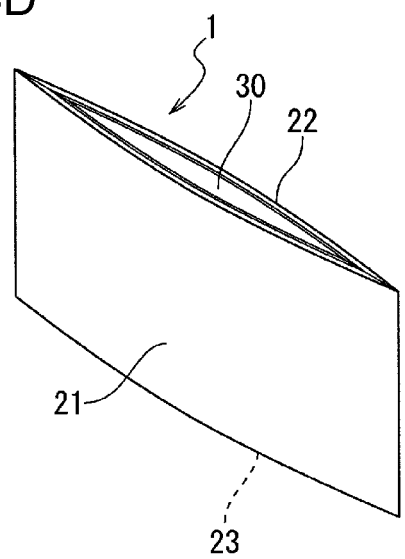
Figure 4E:
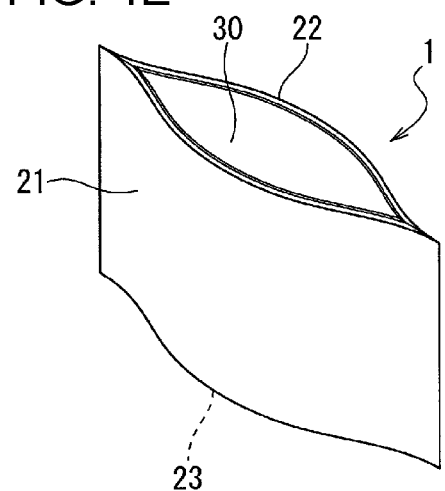

Next, as shown in FIG. 4C, the side sealing portions 24, 24 at one edge in the width direction of the packaging container 1, and the bottom surface sealing portion 25 of the front surface portion 21 or the rear surface portion 22 and the bottom surface sealing portion 25 of the bottom surface portion 23 are placed tightly together and fixed, for example, by thermocompression sealing or ultrasonic welding. Then, by fixing the side sealing portion 24 and the bottom surface sealing portion 25 at the other edge in the width direction of the packaging container 1 in the same manner, the packaging container 1 having a shape as shown in FIG. 4D is obtained. The packaging container 1 has a bag shape provided with the containing portion 30 where both edge parts extending in the longitudinal direction (the first direction), of the packaging container 1 in the sheet state, form an opening part. Further, as shown in FIG. 4E, the packaging container 1 can be self-supported by extending the opening part, and pressing the first area 23a and the second area 23b from inside the containing portion 30 to make most of the first area 23a and the second area 23b be in contact with the surface on which the packaging container 1 is placed. The packaging container 1 is sealed after food is stored in the containing portion 30, by fixing the sealing portions 28 shown in FIG. 4A to each other similarly to the side sealing portion 24 and the bottom surface sealing portion 25 under, for example, reduced pressure of the containing portion 30.

When the packaging container 1 stores food therein and is stood upright with the bottom portion 23 facing downward, the food flows towards the bottom surface portion 23. Further, due to the flow of the food, the internal pressure of the bottom surface portion 23 of the containing portion 30 increases, and therefore the bottom surface portion 23 folded between the front surface portion 21 and the rear surface portion 22 opens and the one edge side (side of the bottom surface portion 23) of the containing portion 30 bulges. As a result, the packaging container 1 stands upright by itself with the bottom surface portion 23 facing downward. At this time, in order to have the packaging container 1 stably stand upright by itself, it is useful to increase the thickness of the substrate 2A to enhance the rigidity of the laminated sheet 2. However, when the rigidity of the laminated sheet 2 is too high, it is difficult to fold the bottom surface portion 23 inside with a bag making machine. Thus, the inventors of the present invention studied folding with a bag making machine, and found out that folding with a bag making machine is possible with a laminated sheet 2 having a Taber stiffness (stiffness) measured by a Taber stiffness tester method in accordance with JIS (Japanese Industrial Standards) P8125: 2000 of 1.01 mN·m or less. Therefore, since folding with a bag making machine is possible with a laminated sheet 2 having a stiffness of approximately 1.01 mN·m or less, it is possible to provide the stably freestanding packaging container 1.

Here, the term "rigidity" refers to paper stiffness, which is generally called "koshi" in Japanese. Further, the Taber stiffness tester method is a type of a load test method.

Moreover, the laminated sheet 2 includes a paper substrate as the substrate 2A. The paper substrate can significantly reduce the energy required during combustion as compared to a plastic substrate during disposal. Therefore, the packaging container 1 constituted by the laminated sheet 2 including a paper substrate can reduce load on the environment.

Moreover, the bottom surface portion 23 of the packaging container 1 is folded between the front surface portion 21 and the rear surface portion 22 from the front surface portion 21 and the rear surface portion 22, and therefore a sealing portion where the front surface portion 21 and the rear surface portion 22, and the bottom surface portion 23 are overlapped with one another and are sealed is not present at the first end of the front surface portion 21 and the rear surface portion 22. If a sealing portion were present in the first end of the front surface portion 21 and the rear surface portion 22, and also the packaging container stands upright with the bottom portion 23 facing downward, the bottom surface portion would be in a state of being raised from the installation surface where the bottom surface portion 23 of the packaging container 1 contacts, for example, the turntable of a microwave oven. That is, a part of the bottom surface portion 23 would be in a state of being separated (floating) from the turntable. In a microwave oven, the heating power on the installation surface side is high, and therefore heating of food is affected in a packaging container where the bottom surface portion is raised from the installation surface. On the other hand, in the packaging container 1 according to the first embodiment, a sealing portion is not present at the first end of the front surface portion 21 and the rear surface portion 22, and therefore the bottom surface portion 23 would not be in a state of being raised from the installation surface. Accordingly, heating with a microwave oven can be performed efficiently as compared to the case where a sealing portion is present at the first end of the front surface portion 21 and the rear surface portion 22.

The packaging container 1 may use a sheet containing cellulose as a substrate. Further, the packaging container 1 may use, as paper substitute, a stone paper mainly composed of an inorganic mineral, for example, a new material LIMEX mainly composed of limestone developed and manufactured by TBM Co., Ltd. may be used.

Stone paper is a material that uses limestone and resin. Further, the inorganic mineral refers to a natural mineral such as a limestone, but may also include an artificial material having similar or the same properties as a natural mineral. Examples of the artificial material include synthetic calcium carbonate or synthetic mica.

Moreover, materials including cellulose include paper, those using paper and resin, for example, those having resin coated on paper, and those having cellulose fibers coated on resin. Cellulose itself is not limited to plant-derived substances such as wood and grass, but includes cellulose-like substances derived from natural polysaccharides (substances constituting silk, substances produced by sea squirts), substances where substituent(s) is(are) introduced to cellulose or cellulose-like substances, or substances where their molecular weights are made smaller (lengths of the molecules are shortened) and the like.

The resins used for the substances mentioned above include thermoplastic resins (polyethylene, polypropylene, PET, polyvinyl acetate resin, acrylic resin and the like), heat (photo) curable resins (urethane, epoxy, phenol resin and the like), water-soluble polymers (polyvinyl alcohol, thermoplastic resins, thermosetting resins which can be applied as water-soluble dispersions) and the like.

Here, the packaging container 1 of the first embodiment uses a paper substrate as the substrate 2A of the laminated sheet 2. In this case, heating with a microwave oven is possible. Conventionally, a packaging container using a laminated sheet having an aluminum foil held between various plastic films is known, but this packaging container cannot be heated with a microwave oven. Moreover, a packaging container using alumina or silica vapor deposited film which can be heated with a microwave oven is known, but the alumina or silica vapor deposited film is thin, and therefore the stiffness is low and the stability of packaging container to stand upright by itself in particular on the palm is low. On the other hand, the packaging container 1 of the first embodiment has high stiffness, and it is possible to eat and drink directly from the storage container during an emergency or disaster.

Moreover, the packaging container 1 of the first embodiment uses a paper substrate as the substrate 2A of the laminated sheet 2, and therefore even when processed with heat, a design and the like drawn on the front surface portion 21 and the rear surface portion 22 are not affected. In addition, it is possible to write names and sentences on the front surface portion 21 and the rear surface portion 22. Also, it is environmentally friendly and excessive packaging is not necessary. Moreover, it is lightweight, and is also useful as an alternative to cans and bottles from the perspective of transportation cost and ease of disposal in terms of environment.

Referring to FIGS. 7A, 7B, 7C, 7D, 8A, 8B, and 8C, a method of producing the packaging container 1 according to the first embodiment of the present invention will be described.

First, the laminated sheet 2 shown in FIG. 7A is prepared. As shown in FIG. 1, the laminated sheet 2 has a laminated structure where at least the substrate 2A, the barrier layer 2B and the sealant layer 2C are laminated in this order. Further, as shown in FIG. 7A, the laminated sheet 2 is formed in a rectangle having an X direction (a height direction) which is a first direction and a Y direction (a width direction) which is a second direction, the X direction and the Y direction being perpendicular to each other in the same plane. Further, the laminated sheet 2 has a structure where the front surface portion 21, the first area 23a and the second area 23b of the bottom surface portion 23, and the rear surface portion 22 are defined by scores in this order along the X direction.

Next, as shown in FIG. 7B, the laminated sheet 2 is folded in half such that the front surface portion 21 and the rear surface portion 22, and the first area 23a and the second area 23b of the bottom surface portion 23 are respectively overlapped with each other. The laminated sheet 2 is folded along a score between the first area 23a and the second area 23b of the bottom surface portion 23 such that the sealant layer 2C on a first side faces the sealant layer 2C on a second side. That is, in the laminated sheet 2 folded in half, the sealant layer 2C of the front surface portion 21 and that of the rear surface portion 22 face each other (see FIG. 5), and similarly, the sealant layer 2C of the first area 23a and that of the second area 23b of the bottom surface portion 23 face each other. Further, the substrate 2A of each of the front surface portion 21 and the rear surface portion 22 serves as an outermost layer (see FIG. 5), and similarly the substrate 2A of each of the first area 23a and the second area 23b of the bottom surface portion 23 serves as an outermost layer.

Next, as shown in FIG. 7C, in a state where the first area 23a and the second area 23b of the bottom surface portion 23 are aligned with each other, the blanked portion 27 is formed where a part of each of the first area 23a and the second area 23b is removed from each of the rims on both sides of the first area 23a and the second area 23b in the Y direction. The blanked portion 27 is formed by performing a blanking process (punching process) in a state where, for example, the first area 23a and the second area 23b are aligned with each other.

Next, as shown in FIG. 7D, the blanked portions 27 of each of the first area 23a and the second area 23b of the bottom surface portion 23 face each other, and the first area 23a and the second area 23b are folded between the front surface portion 21 and the rear surface portion 22 such that the first area 23a and the second area 23b are aligned with each other. In this step, each of the substrates 2A of the first area 23a and the second area 23b of the bottom surface portion 23 face each other. Further, each of the sealant layers 2C of the front surface portion 21 and the first area 23a face each other, and each of the sealant layers 2C of the rear surface portion 22 and the second area 23b face each other.

Then, at both sides of the front surface portion 21 and the rear surface portion 22 in the Y direction, each of the sealant layers 2C of the front surface portion 21 and the first area 23a, and each of the sealant layers 2C of the rear surface portion 22 and that of the second area 23b are respectively sealed with the first area 23a and the second area 23b of the bottom surface portion 23 being overlapped with each other. These sealings are performed by, for example, thermocompression sealing or ultrasonic welding. Through this step, as shown in FIG. 8A, the reinforcing sealing portion 25a is formed where the sealant layer 2C of the front surface portion 21 and that of the first area 23a are sealed to each other, and the reinforcing sealing portion 25b is formed where the sealant layer 2C of the rear surface portion 22 and that of the second area 23b are sealed to each other. The reinforcing sealing portion 25a is formed in an oblique direction towards the bottom edge 21a of the front surface portion 21 (a folded portion between the front surface portion 21 and the first area 23a of the bottom surface portion 23 as shown in FIG. 7D) from each of the edges extending in the X direction of the front surface portion 21. Moreover, the reinforcing sealing portion 25b is also formed in an oblique direction towards the bottom edge 22a of the rear surface portion 22 (a folded portion between the rear surface portion 22 and the second area 23b of the bottom surface portion 23 as shown in FIG. 7D) from each of the edges extending in the X direction of the rear surface portion 22.

Next, at both end portions of the front surface portion 21 and the rear surface portion 22 in the Y direction, the sealant layers 2C are sealed to one another throughout the double-layered region where the front surface portion 21 and the rear surface portion 22 are overlapped with each other, and the quadruple-layered region where the front surface portion 21, the rear surface portion 22, the first area 23a and the second area 23b of the bottom surface portion 23 are overlapped with one another. These sealings are performed by, for example, thermocompression sealing or ultrasonic welding. Through this step, as shown in FIG. 8B, the point sealing portions 26 are formed where the sealant layers 2C are sealed to one another throughout the double-layered region and the quadruple-layered region.

Next, at both end portions of the front surface portion 21 and the rear surface portion 22 in the Y direction, the sealant layer 2C of the front surface portion 21 and that of the rear surface portion 22, the sealant layer 2C of the front surface portion 21 and that of the first area 23a of the bottom surface portion 23, the sealant layer 2C of the rear surface portion 22 and that of the second area 23b of the bottom surface portion 23, and the sealant layer 2C of the front surface portion 21 and that of the rear surface portion 22 through the blanked portion 27 of each of the first area 23a and the second area 23b are sealed to each other. These sealings are performed by, for example, thermocompression sealing or ultrasonic welding. Through this step, as shown in FIG. 8C, the side sealing portion 24 and the bottom surface sealing portion 25 are formed, the side sealing portion 24 having two-layered structure in which the sealant layers 2C are sealed to each other by overlapping the edges of the front surface portion 21 and of the rear surface portion 22 in the Y direction, and the bottom surface sealing portion 25 having four-layered structure in which the sealant layers 2C are sealed to one another by overlapping the edges of the front surface portion 21, of the rear surface portion 22, of the first area 23 and of the second area 23b of the bottom surface portion 23 in the Y direction.

Then, the laminated sheet 2, where the side sealing portion 24, the bottom surface sealing portion 25, the reinforcing sealing portions 25a and 25b, and point sealing portions are formed, is cut into a predetermined shape, thereby producing the packaging container 1 shown in FIGS. 2 and 3 which is almost completed. In this cutting step, the notch 29 is formed in the side sealing portion 24.

According to the method of producing the packaging container 1 according to the first embodiment of the present invention, it is possible to produce the stably freestanding packaging container.

Moreover, according to the method of producing the packaging container 1 according to the first embodiment of the present invention, the sealant layers 2C of the laminated sheet 2 in the side sealing portion 24, the bottom surface sealing portion 25, the reinforcing sealing portions 25a and 25b, and the point sealing portions 26 can be sealed to one another, and therefore the packaging container 1 excellent in sealing performance can be produced.

In the first embodiment, the reinforcing sealing step (see FIG. 8A) forming the reinforcing sealing portions 25a and 25b, the point sealing step (see FIG. 8B) forming the point sealing portions 26, and the side face and bottom face sealing step (see FIG. 8C) forming the side sealing portion 24 and the bottom surface sealing portion 25 have been described in this order, but the order of these sealing steps is not limited to this and there is no particular order. For example, when the reinforcing sealing step shown in FIG. 8A is described as S1, the point sealing step shown in FIG. 8B is described as S2, and the side face and bottom face sealing step shown in FIG. 8C is described as S3, the order may be S1→S3→S2, S2→S1→S3, S2→S3→S1, S3→S1→S2, or S3→S2→S1.

Moreover, in either one of the front surface portion 21 or the rear surface portion 22, an insertion part that makes it possible to insert a straw into the containing portion 30 from the outside, or a vapor discharge part that allows vapor in the containing portion 30 to escape outside when pressure in the containing portion 30 rises to a certain level or higher by heating the content (food or drink) in the sealed containing portion 30 may be provided.

Examples and Comparative Example of the present embodiment are hereinafter shown. The present embodiment should not be limited to the following examples.

Example 1

In Example 1, the same packaging container as that of the first embodiment was provided using a laminated sheet made of the following materials as the laminated sheet 2.

For the substrate 2A, a paper substrate having a basis weight of 70 g/m$^2$ and a thickness of 133 µm was used. Further, for the barrier layer 2B, a barrier film having a thickness of 12 µm by deposition of an inorganic compound was used. Further, for the sealant layer 2C, an unstretched polypropylene film (CPP film) having a thickness of 70 µm was used. Further, the size 23h of the bottom folded depth was set to 18% of the height 1h of the packaging container 1.

The packaging container of the Example 1 stably stood upright by itself with food being contained therein.

Example 2

In Example 2, the packaging container was provided using a laminated sheet made of the following materials as the laminated sheet 2.

For the substrate 2A, a paper substrate having a basis weight of 80 g/m$^2$ and a thickness of 139 µm was used. Further, for the barrier layer 2B and the sealant layer 2C, the same films as those of Example 1 were used. Further, the size 23h of the bottom folded depth was set to the same size as that of the Example 1.

The packaging container of the Example 2 also stably stood upright by itself with food being contained therein.

Example 3

In Example 3, the packaging container was provided using a laminated sheet made of the following materials as the laminated sheet 2.

For the substrate 2A, a paper substrate having a basis weight of 90 g/m$^2$ and a thickness of 146 µm was used. Further, for the barrier layer 2B and the sealant layer 2C, the same films as those of Example 1 were used. The size 23h of the bottom folded depth was set to the same size as that of the Example 1.

The packaging container of the Example 3 also stably stood up by itself with food being contained therein.

Example 4

In Example 4, the packaging container was provided using a laminated sheet made of the following materials as the laminated sheet 2.

For the substrate 2A, a paper substrate having a basis weight of 100 g/m$^2$ and a thickness of 157 µm was used. Further, for the barrier layer 2B and the sealant layer 2C, the same films as those of Example 1 were used. Further, the size 23h of the bottom folded depth was set to the same size as that of the Example 1.

The packaging container of the Example 4 also stably stood upright by itself with food being contained therein.

Example 5

In Example 5, the packaging container was provided using a laminated sheet made of the following materials as the laminated sheet 2.

For the substrate 2A, a paper substrate having a basis weight of 110 g/m$^2$ and a thickness of 177 μm was used. Further, for the barrier layer 2B and the sealant layer 2C, the same films as those of Example 1 were used. Further, the size 23h of the bottom folded depth was set to the same size as that of the Example 1.

The packaging container of the Example 5 also stably stood upright by itself with food being contained therein.

Example 6

In Example 6, the packaging container was produced using a laminated sheet made of the following materials as the laminated sheet 2.

For the substrate 2A, a paper substrate having a basis weight of 120 g/m$^2$ and a thickness of 193 μm was used. Further, for the barrier layer 2B and the sealant layer 2C, the same films as those of Example 1 were used. Further, the size 23h of the bottom folded depth was set to the same size as that of the Example 1.

The packaging container of the Example 6 also stably stood upright by itself with food being contained therein.

Example 7

In Example 7, the packaging container was provided using a laminated sheet made of the following materials as the laminated sheet 2.

For the substrate 2A, a paper substrate having a basis weight of 140 g/m$^2$ and a thickness of 221 μm was used. Further, for the barrier layer 2B and the sealant layer 2C, the same films as those of Example 1 were used. Further, the size 23h of the bottom folded depth was set to the same size as that of the Example 1.

The packaging container of the Example 7 also stably stood upright by itself with food being contained therein.

Example 8

In Example 8, the packaging container was provided using a laminated sheet made of the following materials as the laminated sheet 2.

For the substrate 2A, a paper substrate having a basis weight of 80 g/m$^2$ and a thickness of 139 μm was used. Further, for the barrier layer 2B, an identical film to that of Example 1 was used. Further, for the sealant layer 2C, an unstretched polypropylene film (CPP film) having a thickness of 30 μm was used. Further, the size 23h of the bottom folded depth was set to the same size as that of the Example 1.

The packaging container of the Example 8 also stably stood upright by itself with food being contained therein.

Example 9

In Example 9, the packaging container was provided using a laminated sheet made of the following materials as the laminated sheet 2.

For the substrate 2A, an identical paper substrate to that of Example 8 was used. Further, for the barrier layer 2B, an identical film to that of Example 1 was used. Further, for the sealant layer 2C, an unstretched polypropylene film (CPP film) having a thickness of 40 μm was used. Further, the size 23h of the bottom folded depth was set to the same size as that of the Example 1.

The packaging container of the Example 9 also stably stood upright by itself with food being contained therein.

Example 10

In Example 10, the packaging container was provided using a laminated sheet made of the following materials as the laminated sheet 2.

For the substrate 2A, the same paper substrate as that of Example 8 was used. Further, for the barrier layer 2B, an identical film to that of Example 1 was used. Further, for the sealant layer 2C, an unstretched polypropylene film (CPP film) having a thickness of 50 μm was used. Further, the size 23h of the bottom folded depth was set to the same size as that of the Example 1.

The packaging container of the Example 10 also stably stood upright by itself with food being contained therein.

Example 11

In Example 11, the packaging container was provided using a laminated sheet made of the following materials as the laminated sheet 2.

For the substrate 2A, the same paper substrate as that of Example 8 was used. Further, for the barrier layer 2B, an identical film to that of Example 1 was used. Further, for the sealant layer 2C, an unstretched polypropylene film (CPP film) having a thickness of 60 μm was used. Further, the size 23h of the bottom folded depth was set to the same size as that of the Example 1.

The packaging container of the Example 11 also stably stood upright by itself with food being contained therein.

Comparative Example 1

In Comparative Example 1, the packaging container was provided using a laminated sheet made of the following materials as a laminated sheet.

For the substrate 2A, a plastic film substrate having a density of 1.35 g/cm$^3$ (converted to a basis weight of 20 g/m$^2$) and a thickness of 15 μm was used. Further, for the barrier layer 2B, an identical film to that of Example 1 was used. Further, for the sealant layer 2C, an unstretched polypropylene film (CPP film) having a thickness of 70 μm was used. Further, the size of the bottom folded depth was set to the same size as that of the Example 1.

Evaluation

Taber Stiffness

In Examples 1 to 11 and Comparative Example 1, Taber stiffness (stiffness) of the laminated sheet 2 was measured by a Taber stiffness tester method in accordance with JIS-P8125: 2000. Further, when stiffness was smaller than 0.95 mN·m, it was determined that folding with a bag making machine was possible and was evaluated as "VERY GOOD", and even when stiffness was 0.95 mN·m or more and 1.01 mN·m or less, it was determined that folding with a bag making machine was possible and was evaluated as "GOOD". The measured value of Example 1 was 0.27 mN·m, that of Example 2 was 0.34 mN·m, that of Example 3 was 0.44 mN·m, that of Example 4 is 0.63 mN·m, that of Example 5 was 0.66 mN·m, that of Example 6 was 0.84 mN·m, that of Example 7 was 1.01 mN·m, those of Examples 8 to 11 were all 1.01 mN·m or less, and stiffness was too low to make any measurement in Comparative Example 1. The evaluation results are shown in Table 1.

Sealing Strength

In Examples 1 to 11 and Comparative Example 1, sealing strength was measured at side sealing portions (the side sealing portion 24 and the bottom surface sealing portion 25) of the packaging container by a test method of a heat sealing soft packaging bag and a semi-stiff container in accordance with JIS-Z0238: 1998. Further, when the sealing strength was 40 N/15 mm or more, it was determined as suitable and was evaluated as "VERY GOOD", and even when the sealing strength was larger than 23 [N/15 mm] and less than 40 [N/15 mm], it was determined as suitable and was evaluated as "GOOD". The evaluation results are shown in Table 1. In the Japan Food Sanitation Law, it is set forth that the sealing strength after retort (after heat processing) should be more than 23 [N/15 mm]. Here, the measured value of Example 1 was 61.1 [N/15 mm], that of Example 2 was 54.2 [N/15 mm], that of Example 3 was 49.5 [N/15 mm], that of Example 4 was 47.1 [N/15 mm], that of Example 5 was 48.8 [N/15 mm], that of Example 6 was 45.7 [N/15 mm], that of Example 7 was 25.8 [N/15 mm], that of Example 8 was 30.1 [N/15 mm], that of Example 9 was 25.4 [N/15 mm] and those of Examples 10 and 11 and Comparative Example 1 were all more than 23 [N/15 mm].

Transportation Drop Test

In Examples 1 to 11 and Comparative Example 1, drop tests of the packaging containers were carried out for 36 bags by a transportation drop test (free drop test among impact tests) in accordance with JIS-Z0200: 2013, and when the number of leaked bags was zero, it was evaluated as "VERY GOOD", and when the number of leaked bags was 1 to 7, it was evaluated as "GOOD". The test was performed by dropping the packaging containers from a height of 60 cm.

The evaluation results are shown in Table 1. Here, the number of leaks in Examples 1 to 7 was 4 or less, that in Example 8 was 7, that in Example 9 was 6, that in Example 10 was 5, that in Example 11 was 4, and that in Comparative Example 1 was 7 or less.

TABLE 1

| | Construction | | | | | | Evaluation | | |
|---|---|---|---|---|---|---|---|---|---|
| | Substrate | | | Thickness of barrier layer (μm) | Thickness of sealant layer (μm) | Bottom folded depth (%) | Taber stiffness | Sealing strength | Transportation drop test |
| | Material | Basis weight (g/m²) | Thickness (μm) | | | | | | |
| Example 1 | Paper | 70 | 133 | 12 | 70 | 18 | VERY GOOD | VERY GOOD | GOOD |
| Example 2 | Paper | 80 | 139 | 12 | 70 | 18 | VERY GOOD | VERY GOOD | GOOD |
| Example 3 | Paper | 90 | 146 | 12 | 70 | 18 | VERY GOOD | VERY GOOD | GOOD |
| Example 4 | Paper | 100 | 157 | 12 | 70 | 18 | VERY GOOD | VERY GOOD | GOOD |
| Example 5 | Paper | 110 | 177 | 12 | 70 | 18 | VERY GOOD | VERY GOOD | GOOD |
| Example 6 | Paper | 120 | 193 | 12 | 70 | 18 | VERY GOOD | VERY GOOD | GOOD |
| Example 7 | Paper | 140 | 221 | 12 | 70 | 18 | GOOD | GOOD | GOOD |
| Example 8 | Paper | 80 | 139 | 12 | 30 | 18 | VERY GOOD | GOOD | GOOD |
| Example 9 | Paper | 80 | 139 | 12 | 40 | 18 | VERY GOOD | GOOD | GOOD |
| Example 10 | Paper | 80 | 139 | 12 | 50 | 18 | VERY GOOD | GOOD | GOOD |
| Example 11 | Paper | 80 | 139 | 12 | 60 | 18 | VERY GOOD | GOOD | GOOD |
| Comparative Example 1 | Film | 20 | 15 | 12 | 70 | 18 | POOR | GOOD | GOOD |

As can be seen from Table 1, in all of Examples 1 to 11, it was confirmed that the stiffness of the laminated sheet 2 was 1.01 [mN·m] or less. As a result, in Examples 1 to 11, it becomes possible to fold the laminated sheet 2 with a bag making machine, and therefore it was confirmed that a stably freestanding packaging container 1 could be provided.

Moreover, in consideration of the evaluation results of the sealing strength and transportation drop test, it was also confirmed to be preferable to use the sealant layer 2C comprising a paper substrate having a basis weight of 60 to 140 g/m² and a thickness of 120 to 220 μm as the substrate 2A, the barrier layer 2B and a CPP film having a thickness of 70 μm or more as the sealant layer 2C laminated in this order for the laminated sheet 2.

Meanwhile, in addition to the examples mentioned above, it was confirmed that the packaging container 1 having the size 23h of the bottom folded depth to be 15% to 25% of the size 1h of the height of the packaging container 1 could stand up by itself.

Example 2-1A, Example 2-1B

In Example 2-1A and Example 2-1B, the bottom surface sealing portion 25 of the packaging container of Example 2 was provided with the blanked portion 27 at a position of 5 mm (12.5%) from the bottom edge thereof. Height of the bottom surface sealing portion 25 in the X direction Example 2-2A, Example 2-2B In Example 2-2A and Example 2-2B, the bottom surface sealing portion 25 of the packaging container of Example 2 was provided with the blanked portion 27 at a position of 20 mm (50%) from the bottom edge thereof.

Example 2-3A, Example 2-3B

In Example 2-3A and Example 2-3B, the bottom surface sealing portion 25 of the packaging container of Example 2 is not provided with the blanked portion 27.

Position of Blanked Portion and Bag Breaking Test

In Examples 2-1A to 2-3B, five packaging containers 1 containing 300 ml of water and sealed, and five packaging containers 1 containing 200 ml of water and sealed were prepared. The packaging containers 1 containing 300 ml of water were dropped from a height of 50 cm, and the packaging containers 1 containing 200 ml of water from a height of 100 cm for 10 times for each packaging container 1, and the state of broken bags at the intersection point parts (parts where the bottom surface sealing portion 25 and the reinforcing sealing portions 25a, 25b intersect), the reinforcing sealing portions 25a, 25b and the bottom surface portion 23 were evaluated. In Table 2, each of the intersection point, the V seal, and the bottom is shown. Examples 2-1A, 2-2A and 2-3A are before retort, and Examples 2-1B, 2-2B and 2-3B are after retort. The evaluation results are shown in Table 2. Table 2 shows the number of broken bags of the five bags.

without being broken, and Examples 2-1A to 2-3B all met the standards set forth in the Food Sanitation Law (not shown in the Table). This evaluation method is a stricter evaluation standard than that set forth in the Food Sanitation Law.

However, in Examples 2-3A and B where blanked portions were not used, the numbers of broken bags were large, and from the perspective of improving strength against bag breaking, it is considered that packaging containers with a blanked portion are preferable.

Moreover, it was also confirmed from Examples 2-1A to 2-3B that it is preferable to provide the blanked portion 27 at a position of 2 to 12 mm above the bottom edge 25c of the bottom surface sealing portion 25. The position of the blanked portion 27 of 2 to 12 mm above the bottom edge 25c is equivalent to the size 23h of the bottom folded depth being 5 to 30% of the length of the bottom surface sealing portion 25 in the X-direction. Meanwhile, the position of the blanked portion in Table 2 is the case where the size 23h of the bottom folded depth is 40 mm, and 5 mm of the position of the blanked portion is equivalent to 12.5% of the size 23h of the bottom folded depth. Moreover, 20 mm of the position of the blanked portion is equivalent to 50% of the size 23h of the bottom folded depth.

Example 2-4

In Example 2-4, at the boundary part between the side sealing portion 24 and the bottom surface sealing portion 25 of the packaging container of the Example 2, the point sealing portion 26 with a width of 90% of the sealing width of the side sealing portion 24 and the bottom surface sealing portion 25 was provided toward each of the side sealing portion 24 and the bottom surface sealing portion 25.

Example 2-5

In Example 2-5, at the boundary part between the side sealing portion 24 and the bottom surface sealing portion 25

TABLE 2

| | Construction | | | | | Evaluation | | | | | |
|---|---|---|---|---|---|---|---|---|---|---|---|
| | Substrate | | | Position of blanked portion | | 300 ml of water Height 50 cm | | | 200 ml of water Height 100 cm | | |
| | Basis weight (g/m²) | Thickness (μm) | Thickness of barrier layer (μm) | Thickness of sealant layer (μm) | (mm) | (%) | Intersection point | V seal | Base | Intersection point | V seal | Base |
| Example 2-1A | 80 | 139 | 12 | 70 | 5 | 12.5 | 0 | 1 | 0 | 0 | 0 | 0 |
| Example 2-1B | 80 | 139 | 12 | 70 | 5 | 12.5 | 0 | 0 | 0 | 0 | 0 | 0 |
| Example 2-2A | 80 | 139 | 12 | 70 | 20 | 50 | 1 | 0 | 0 | 0 | 0 | 1 |
| Example 2-2B | 80 | 139 | 12 | 70 | 20 | 50 | 0 | 0 | 0 | 0 | 1 | 0 |
| Example 2-3A | 80 | 139 | 12 | 70 | None | None | 3 | 0 | 0 | 1 | 1 | 0 |
| Example 2-3B | 80 | 139 | 12 | 70 | None | None | 2 | 0 | 0 | 4 | 0 | 0 |

As can be seen from Table 2, in Examples 2-1A to 2-3B, it was confirmed that all the packaging containers met sufficient bag breaking resistance strength.

Here, the Japanese Food Sanitation Law sets forth that a bag must be able to be dropped twice from a height of 50 cm of the packaging container of the Example 2, the point sealing portion 26 with a width of 60% of the sealing width of the side sealing portion 24 and the bottom surface sealing portion 25 was provided toward each of the side sealing portion 24 and the bottom surface sealing portion 25.

Example 2-6

In Example 2-6, at the boundary part between the side sealing portion 24 and the bottom surface sealing portion 25 of the packaging container of the Example 2, the point sealing portion 26 with a width of 40% of the sealing width of the side sealing portion 24 and the bottom surface sealing portion 25 was provided toward each of the side sealing portion 24 and the bottom surface sealing portion 25.

Width of Point Sealing Portion and Transportation Drop Test

In Examples 2-4 to 2-6, similarly to the Examples 1 to 11 and Comparative Example 1 mentioned above, by transportation drop tests (free drop tests among impact tests) in accordance with the packaged cargo of JIS-Z0200: 2013, drop tests of packaging containers each containing 200 ml of water were performed for 42 bags, drop tests of packaging containers each containing 250 ml of water were performed for 36 bags, and drop tests of packaging containers each containing 300 ml of water were performed for 30 bags, and the numbers of leaks were evaluated. The test was performed by dropping the packaging containers from a height of 60 cm. The evaluation results are shown in Table 3.

TABLE 3

| | Construction | | | | Evaluation | | |
|---|---|---|---|---|---|---|---|
| | Substrate | | Thickness of barrier layer | Thickness of sealant layer | Point sealing width | Leak check (the number of leaks) | | |
| | Basis weight | Thickness | | | | | | |
| | (g/m²) | (μm) | (μm) | (μm) | (%) | 200 ml | 250 ml | 300 ml |
| Example 2-4 | 80 | 139 | 12 | 70 | 90 | 6 | 4 | 7 |
| Example 2-5 | 80 | 139 | 12 | 70 | 60 | 0 | 0 | 3 |
| Example 2-6 | 80 | 139 | 12 | 70 | 40 | 1 | 3 | 7 |

As can be seen from Table 3, it was confirmed in Example 2-5 that liquid leaks did not occur in the case where the volume of water was 200 ml, and in the case where the volume of water was 250 ml. Thereby, regarding the value of the sealing width of the point sealing portion 26 with respect to the sealing widths of the bottom surface sealing portion 25 and the side sealing portion 24, it is found that the center of the value that shows improvement is approximately 60%, and the range of the value showing a trend of improvement is 40 to 90%.

On the basis of the above, according to the embodiment, it is possible to provide the stably freestanding packaging container 1 having high reliability.

Second Embodiment

A packaging container 1A according to the second embodiment of the present invention has nearly the same constitution as the packaging container 1 of the first embodiment mentioned above, and the following constitution is different.

Figure 9:
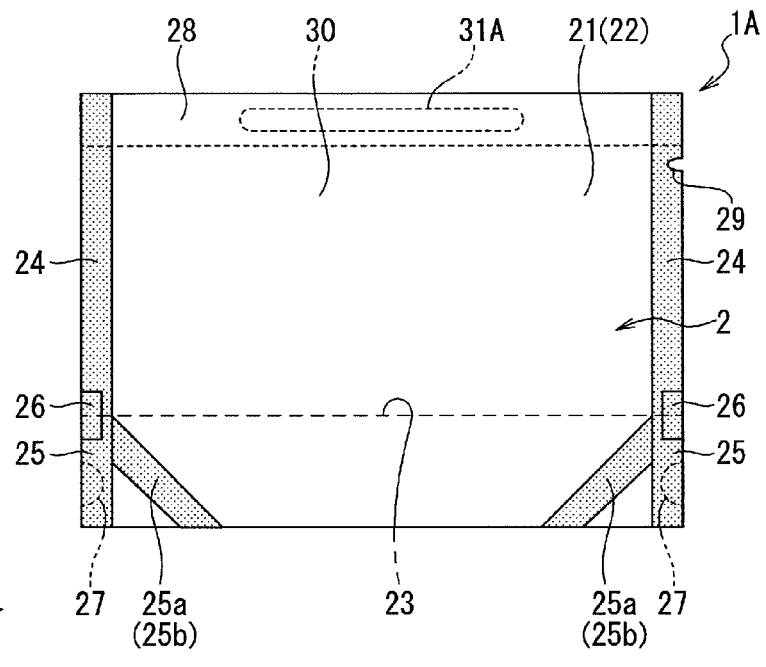
FIG. 9 is a front view of a front face side of the packaging container according to a second embodiment of the present invention.
Figure 10:
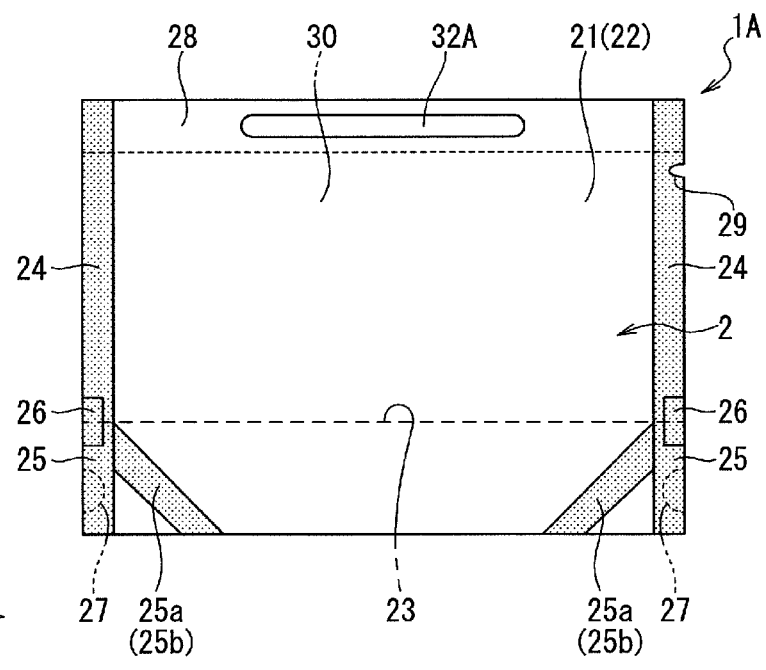
FIG. 10 is a front view illustrating a state where a cutout area shown in FIG. 9 is cut out.

That is, as shown in FIG. 9, the packaging container 1A of the second embodiment is provided with a cutout area 31A in the sealing portion 28 of each of the front surface portion 21 and the rear surface portion 22. The cutout area 31 is surrounded by, for example, a perforation line, and after putting food in the containing portion 30 and sealing the sealing portion 28, it can be easily cut out from the sealing portion 28. In the second embodiment, as shown in FIG. 10, the cutout area 31A has a length in the width direction (Y direction) longer than the length in the height direction (X direction) so that a cutout hole 32A after the cutout area 31A is cut out can be used, for example, as a handle.

As such, by providing the long shaped cutout area 31A in the sealing portion 28, the cutout hole 32A after the cutout area 31A is cut out can be used as a handle, and concurrently, by holding the cutout hole 32A as a handle, it is possible to easily transport the heated packaging container 1A heated with a microwave oven or the like.

Moreover, by devising the shape of the cutout area 31A, it is possible to use the cutout area 31A after being cut out from the sealing portion 28 as a tool such as a spoon so that the sealing portion 28 can be effectively used.

Meanwhile, when the cutout area 31A is provided in the sealing portion 28, it is preferable to enhance the sealing strength by making the width in the X direction larger than the sealing portion 28 of the first embodiment mentioned above.

Third Embodiment

Figure 11:
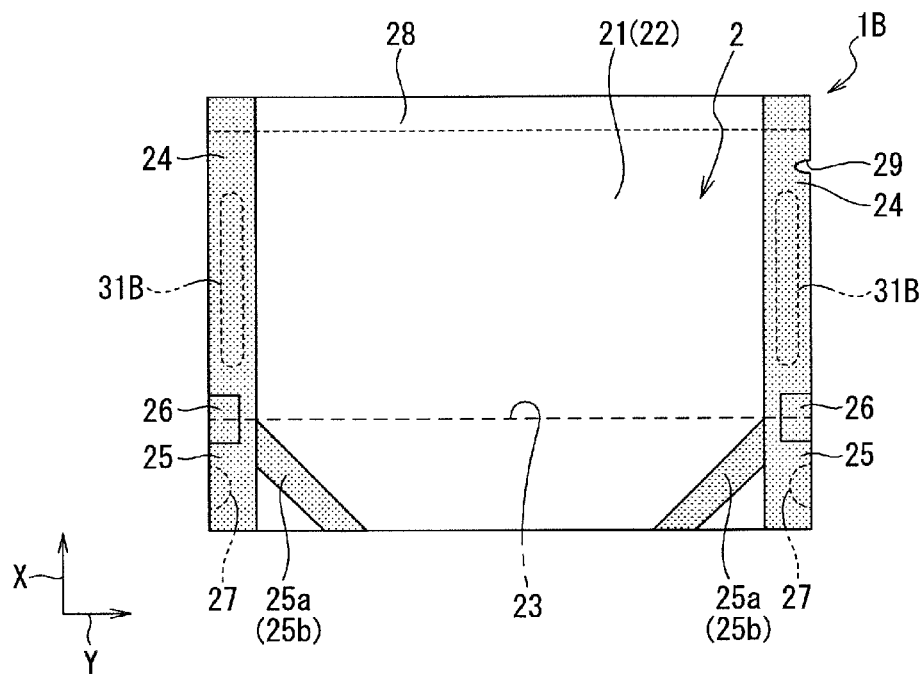
FIG. 11 is a front view of a front face side of the packaging container according to a third embodiment of the present invention.
Figure 12:
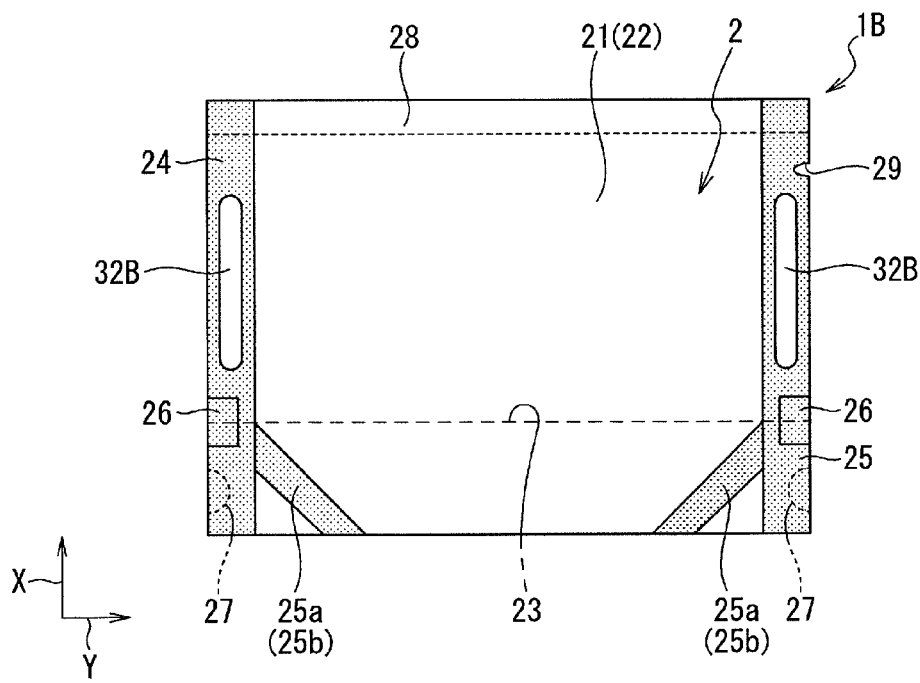
FIG. 12 is a front view showing a state where a cutout area shown in FIG. 11 is cut out.

A packaging container 1B according to the third embodiment of the present invention modifies the position of forming a cutout area. That is, as shown in FIG. 11, the packaging container 1B of the third embodiment is provided with a cutout area 31B in each of two side sealing portions 24 positioned on the opposite sides in the width direction (Y direction). In the third embodiment also, the cutout area 31B is surrounded by, for example, a perforation line, and after putting food in the containing portion 30 and sealing the sealing portion 28, it can be easily cut out from the side sealing portion 24. Moreover, as shown in FIG. 12, the cutout area 31B has a length in the width direction (Y direction) longer than the length in the height direction (X direction) so that a cutout hole 32B after the cutout area 31B is cut out can be used, for example, as a handle.

As such, by providing the long shaped cutout area 31B in each of the two side sealing portion 24, the cutout hole 32B after the cutout area 31B is cut out can be used as a handle, and concurrently, by using the cutout hole 32B as a handle, it is possible to easily transport the heated packaging container 1B heated with a microwave oven or the like.

Moreover, by devising the shape of the cutout area 31B, it is possible to use the cutout area 31B after being cut out from the sealing portion 28 as a tool such as a spoon so that the side sealing portion 24 can be effectively used.

Further, in the case where the cutout area 31B is provided in the side sealing portion 24, it is preferable to increase the width in the Y direction as compared to the first and second embodiments mentioned above to enhance the sealing strength.

Moreover, in the third embodiment, the case where the cutout area 31B is provided in each of the two side sealing portions 24 was described, but the cutout area 31B may be provided in either one of the two side sealing portions 24.

Meanwhile, in the embodiment mentioned above, packaging containers 1, 1A and 1B for ready-made meals were described. However, the present invention is not limited to this embodiment, and can be applied to packaging containers for drinks, food and the like.

In the descriptions above, the present invention has been specifically described on the basis of the embodiments and examples mentioned above. However, the present invention is not limited to the embodiments and examples mentioned above, and needless to say, it can be modified in various ways within the scope not deviating the substance thereof.

[Reference Signs List] 1 . . . Packaging container; 2 . . . Laminated sheet; 2A . . . Substrate; 2B . . . Barrier layer; 2C . . . Sealant layer; 21 . . . Front surface portion; 22 . . . Rear surface; 23 . . . Bottom surface; 23a . . . First area; 23b . . . Second area; 24 . . . Side sealing portion; 25 . . . Bottom surface sealing portion; 26 . . . Point sealing portion; 27 . . . Blanked portion; 28 . . . Sealing portion; 29 . . . Notch; 30 . . . Containing portion; 31A, 31B . . . Cutout area; 32A, 32B . . . Cutout hole.

What is claimed is:

1. A packaging container, comprising:
a laminated sheet where at least a substrate, a barrier layer and a sealant layer are laminated together in this order,
wherein the laminated sheet has a stiffness of 1.01 mN·m or less measured by a Taber stiffness tester method in accordance with JIS-P8125, and
wherein the substrate is a substrate having a basis weight of 60 to 140 g/m² and a thickness of 120 to 220 μm, and,
the sealant layer is a CPP film having a thickness of 30 μm or more.

2. The packaging container of claim 1, comprising:
the laminated sheet, wherein the packaging container has a front surface portion and a rear surface portion disposed so that the sealant layers face each other, a bottom surface portion folded between the front surface portion and the rear surface portion from a first end of the front surface portion and the rear surface portion, side sealing portions having two-layered structure in which edge portions of the front surface portion and the rear surface portion in the width direction are overlapped with each other and are sealed, and a bottom surface sealing portion having four-layered structure in which edge portions of the front surface portion and the rear surface portion, and edge portions of the bottom surface portion in the width direction are overlapped with one another and are sealed,
wherein a depth of a bottom folded depth where the bottom surface portion is folded is set to 10 to 40% of a height of the side face part.

3. The packaging container of claim 2,
wherein a point sealing having a width of 40 to 90% of a sealing width is provided at each boundary portion between the bottom surface sealing portion and the side sealing portion.

4. The packaging container of claim 1,
wherein a blanked portion is provided at each bottom surface sealing portion at a position of 5 to 50% of the bottom folded depth from the bottom edge of the bottom surface sealing portion.

5. The packaging container of claim 1,
wherein the substrate comprises a material containing cellulose, or a material containing resin and natural mineral.

6. The packaging container of claim 1, wherein the CPP film has the thickness of 50.0 μm or more.

7. The packaging container of claim 1, wherein the CPP film has the thickness of 70.0 μm or more.

8. The method of claim 1, wherein the CPP film has the thickness of 50.0 μm or more.

9. The method of claim 1, wherein the CPP film has the thickness of 70.0 μm or more.

10. A packaging container produced by a method of producing a packaging container, comprising:
a step of preparing a laminated sheet including a substrate, a barrier layer and a sealant layer laminated together in this order, wherein the laminated sheet is formed in a rectangle having a first direction and a second direction perpendicular to each other, and a front surface portion, a first area and a second area of a bottom surface portion, and a rear surface portion are defined and formed in this order along the first direction;
a step of folding the laminated sheet in half so that the folded sealant layers face each other, and the front surface portion and the rear surface portion, and the first area and the second area of the bottom surface portion are respectively overlapped with each other;
a step of forming a blanked portion at both edges of the first area and the second area in the second direction of the first area and the second area by removing part of the both edges of the first area and the second area with the first area and the second area of the bottom surface portion being overlapped with each other;
a step of folding the first area and the second area inside between the front surface portion and the rear surface portion such that the blanked portions of each of the first area and the second area face each other, and the first area and the second area are overlapped with each other; and,
a step of sealing each sealant layer of the front surface portion and the rear surface portion, each sealant layer of the front surface portion and the first area of the bottom surface portion, each sealant layer of the rear surface portion and the second area of the bottom surface portion, and each sealant layer of the front surface portion and the rear surface portion through each of the blanked portions of the first area and the second area at both end portions of the front surface portion and the rear surface portion in the second direction, wherein the substrate is a substrate having a basis weight of 60 to 140 g/m² and a thickness of 120 to 220 μm, and,
each sealant layer is a CPP film having a thickness of 30 μm or more.

11. A packaging container produced by the method of producing a packaging container of claim 10,
further comprising a step of sealing each sealant layer of the front surface portion and the first area of the bottom surface portion, each sealant layer of the front surface portion, and each sealant layer of the rear surface portion and the second area of the bottom surface portion at both end portions of the front surface portion and the rear surface portion in the second direction with the first area and the second area of the bottom surface portion being overlapped with each other.

12. The packaging container produced by the method of producing a packaging container of claim 10,
further comprising a step of sealing part of the sealant layers of a double-layered region in which the front surface portion and the rear surface portion are overlapped with each other and a quadruple-layered region in which the front surface portion, the rear surface portion, and the first area and the second area of the bottom surface portion are overlapped with one another, at both end portions of the front surface portion and the rear surface portion in the second direction.

13. The packaging container of claim 10, wherein the CPP film has the thickness of 50.0 µm or more.

14. The packaging container of claim 10, wherein the CPP film has the thickness of 70.0 µm or more.

15. A method of producing a packaging container, comprising the steps of:
a step of preparing a laminated sheet including a substrate, a barrier layer and a sealant layer laminated together in this order, wherein the laminated sheet is formed in a rectangle having a first direction and a second direction perpendicular to each other, and a front surface portion, a first area and a second area of a bottom surface portion, and a rear surface portion are defined and formed in this order along the first direction;
a step of folding the laminated sheet in half so that the folded sealant layers face each other, and the front surface portion and the rear surface portion, and the first area and the second area of the bottom surface portion are respectively overlapped with each other;
a step of forming a blanked portion at both edges of the first area and the second area in the second direction of the first area and the second area by removing part of the both edges of the first area and the second area with the first area and the second area of the bottom surface portion being overlapped with each other;
a step of folding the first area and the second area inside between the front surface portion and the rear surface portion such that the blanked portions of each of the first area and the second area face each other, and the first area and the second area are overlapped with each other; and,
a step of sealing each sealant layer of the front surface portion and the rear surface portion, each sealant layer of the front surface portion and the first area of the bottom surface portion, each sealant layer of the front surface portion and the second area of the bottom surface portion, and each sealant layer of the front surface portion and the rear surface portion through each of the blanked portions of the first area and the second area at both end portions of the front surface portion and the rear surface portion in the second direction, wherein the substrate is a substrate having a basis weight of 60 to 140 g/m$^2$ and a thickness of 120 to 220 µm, and,
each sealant layer is a CPP film having a thickness of 30 µm or more.

16. The method of producing the packaging container of claim 15,
further comprising a step of sealing each sealant layer of the front surface portion and the first area of the bottom surface portion, each sealant layer of the front surface portion, and each sealant layer of the rear surface portion and the second area of the bottom surface portion at both end portions of the front surface portion and the rear surface portion in the second direction with the first area and the second area of the bottom surface portion being overlapped with each other.

17. The method of producing the packaging container of claim 15,
further comprising a step of sealing part of the sealant layers of a double-layered region in which the front surface portion and the rear surface portion are overlapped with each other and a quadruple-layered region in which the front surface portion, the rear surface portion, and the first area and the second area of the bottom surface portion are overlapped with one another, at both end portions of the front surface portion and the rear surface portion in the second direction.

* * * * *